United States Patent [19]

Kawaguchi et al.

[11] Patent Number: 4,585,184
[45] Date of Patent: Apr. 29, 1986

[54] WEBBING TENSION DEVICE

[75] Inventors: Teruhiko Kawaguchi; Akinori Fujiwara; Yuji Nishimura, all of Aichi, Japan

[73] Assignee: Kabushiki Kaisha Toka-rika-denki-seisakusho, Aichi, Japan

[21] Appl. No.: 634,787

[22] Filed: Jul. 26, 1984

[30] Foreign Application Priority Data

Jul. 27, 1983 [JP] Japan .................................. 58-137254

[51] Int. Cl.⁴ ........................ B65H 75/48; B60R 22/46
[52] U.S. Cl. ..................................... 242/107; 280/806
[58] Field of Search .......... 242/107, 107.4 R–107.4 E; 280/803, 806, 807; 297/475–478

[56] References Cited

U.S. PATENT DOCUMENTS

| | | | |
|---|---|---|---|
| 2,883,123 | 4/1959 | Finnigan | 242/107.4 R |
| 4,447,017 | 5/1984 | Inukai | 242/107.4 A |
| 4,471,918 | 9/1984 | Ando | 242/107 |

Primary Examiner—John M. Jillions
Attorney, Agent, or Firm—Sixbey, Friedman & Leedom

[57] ABSTRACT

In a webbing tension device adapted for use in a webbing retractor for a vehicle in which a takeup shaft retracting an occupant restraining webbing thereon is biased in a direction of a webbing retraction by small resilient means and in an emergency situation of the vehicle a biasing force of large resilient means is transmitted to the takeup shaft through one clutch means so that the takeup shaft is biased in the direction of the webbing retraction by the large resilient means, another clutch means is disposed between the takeup shaft and the large resilient means. Accordingly, when the webbing is fully retracted on the takeup shaft after the vehicle is released from the emergency situation, the another clutch means is put in its connected situation, and when the webbing is unwound from the takeup shaft after it is retracted fully on the takeup shaft, an unwinding rotation of the takeup shaft is transmitted to the large resilient means, so that the large resilient means is wound up.

21 Claims, 6 Drawing Figures

WEBBING TENSION DEVICE

BACKGROUND OF THE INVENTION

1. Field of the Invention

The present invention relates to a webbing tension device adapted for use in a seatbelt system for protecting an occupant in an emergency situation of a vehicle in which a tension is imparted to an occupant restraining webbing, so that the occupant is closely restrained by the webbing.

2. Description of the Prior Art

The seatbelt system is so constructed that the webbing, one end portion thereof being retracted in layers into a webbing retractor, is applied to the occupant and he is closely restrained by the webbing in the emergency situation of the vehicle.

The webbing retractor retracting the webbing therein imparts a predetermined tension to the webbing, but as a retracting force of the webbing retractor is made relatively weak or zero so as not to give the occupant a sense of oppression, a clearance is formed between the occupant and the webbing restraining him, i.e., the webbing restraining the occupant has a slack. Accordingly, it is thought that in the emergency situation of the vehicle the occupant is moved in a direction of such an accident as a collision by the clearance amount until the occupant is surely restrained by the webbing after an unwinding of the webbing is stopped.

For this reason, a webbing tension device transmitting a biasing force of such resilient means as a spiral spring to a webbing takeup shaft of the webbing retractor, thereby imparting a tension to the webbing in the emergency situation of the vehicle has been proposed in the prior art. In such a device the takeup shaft is biased in a direction of a webbing retraction by a biasing force of small resilient means in an ordinary running situation of the vehicle, but in the emergency situation of the vehicle a biasing force of large resilient means is transmitted to the takeup shaft, thereby retracting the webbing on the takeup shaft forcibly.

In the device, however, there is such a problem that it is difficult to be reused after the vehicle is released from the emergency situation.

SUMMARY OF THE INVENTION

In view of the above fact, the present invention has as its object the provision of a webbing tension device for a webbing retractor capable of being reused readily by simple operations after the vehicle is released from the emergency situation.

In the webbing tension device according to the present invention, clutch means is disposed between a webbing takeup shaft and large resilient means, the takeup shaft is connected to the large resilient means through the clutch means when the webbing is fully retracted on the takeup shaft after the vehicle is released from the emergency situation, and, thereafter, when the webbing is unwound from the takeup shaft an unwinding rotation of the takeup shaft is subjected to reduction by the clutch means to be transmitted to the large resilient means, whereby the large resilient means is wound up to be returned back to its initial situation.

Description will hereinunder be given of an embodiment of the present invention with reference to the drawings attached hereto.

PREFERRED EMBODIMENT OF THE INVENTION

Figure 1:
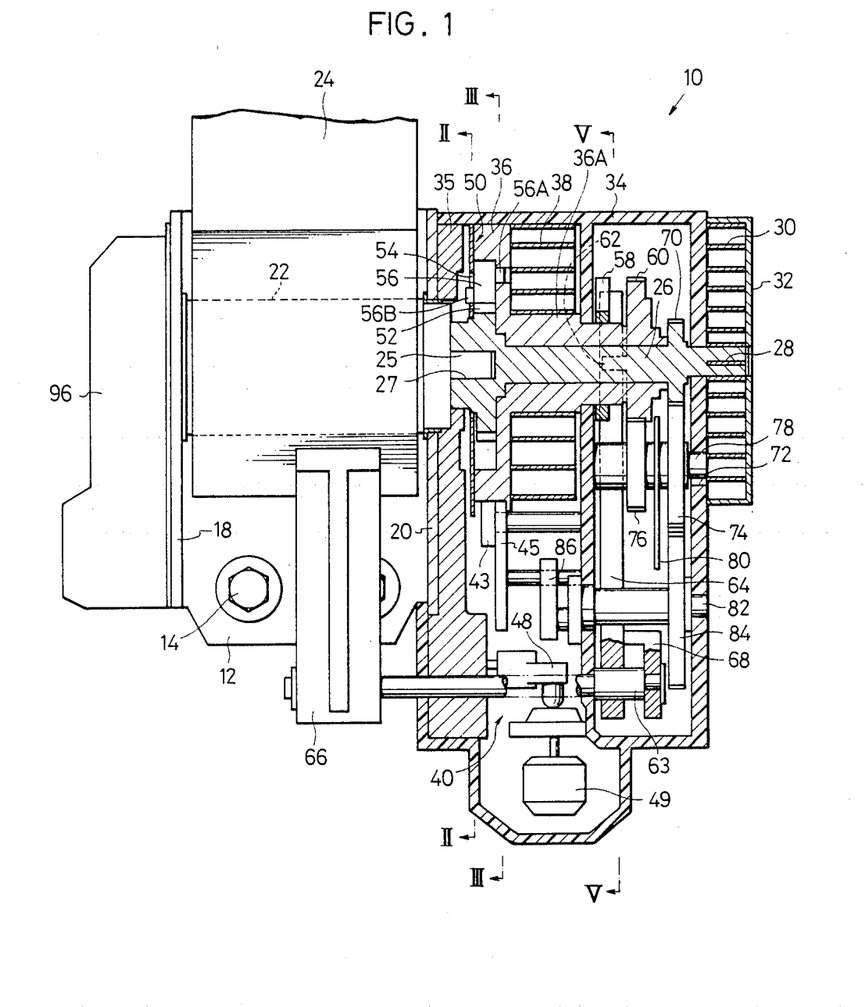
FIG. 1 is a sectional view showing a webbing retractor to which a webbing tension device according to the present invention is applied.

FIG. 1 shows an embodiment in which a webbing tension device according to the present invention is assembled integrally into a webbing retractor 10.

The webbing retractor 10 is fixed at its frame 12 to a vehicle body (not shown) through bolts 14. Extended from both side portions of the frame 12 are a pair of leg plates 18 and 20 in parallel to each other, which rotatably support a webbing takeup shaft 22 at both its end portions. The takeup shaft 22 is secured at its intermediate portion with one end of an occupant restraining webbing 24, and the other end of the webbing is secured with a tongue plate (not shown). The tongue plate is latched to a buckle device (not shown), whereby an occupant can be restrained by the webbing 24 at its intermediate portion. The construction described above is the substantially same as that of a conventional webbing retractor.

One end portion of the takeup shaft 22 is elongated from the leg plate 20 and it is formed with a rectangular axial portion 25 which is fixedly received in a rectangular hole 27 of a small diameter shaft 26 which function as an extension shaft, whereby the small diameter shaft 26 and the takeup shaft 22 are connected coaxially to each other. The small diameter shaft 26 is formed at its forward end portion with a slit 28 which is secured with an inner end of a small spiral spring 30 which functions as a small resilient means. The small spiral spring 30 is housed in a small spring case 32 and an outer end of the small spiral spring 30 is secured to the small spring case 32. The small spring case 32 is fixed to the leg plate 20 through a case 34 and a sheet 35 closely secured to the leg plate 20. Accordingly, the small spiral spring 30 biases the takeup shaft 22 weakly in a direction of a webbing retraction (in a direction of arrow A shown in FIGS. 2 and 3), and when the occupant is restrained by the webbing 24 the small spiral spring 30 causes the webbing 24 to contact softly with the occupant.

Supported rotatably at a cylindrical portion thereof 36A to an outer periphery of the small diameter shaft 26 is an operation wheel 36 so that the operation wheel 36 is rotatable relative to the takeup shaft 22. The cylindrical portion 36A of the operation wheel 36 is secured with an inner end of a large spiral spring 38 which functions as a large resilient means, an outer end thereof being secured to an inner periphery of the case 34.

The large spiral spring 38 gives the operation wheel 36 larger biasing force than the small spiral spring 30. However, the operation wheel 36 is prevented from rotation in a direction of a webbing retraction by trigger means 40 in an ordinary running situation of the vehicle, and only in the emergency situation of the vehicle is it made rotatable in the direction of the webbing retraction.

Figure 3:
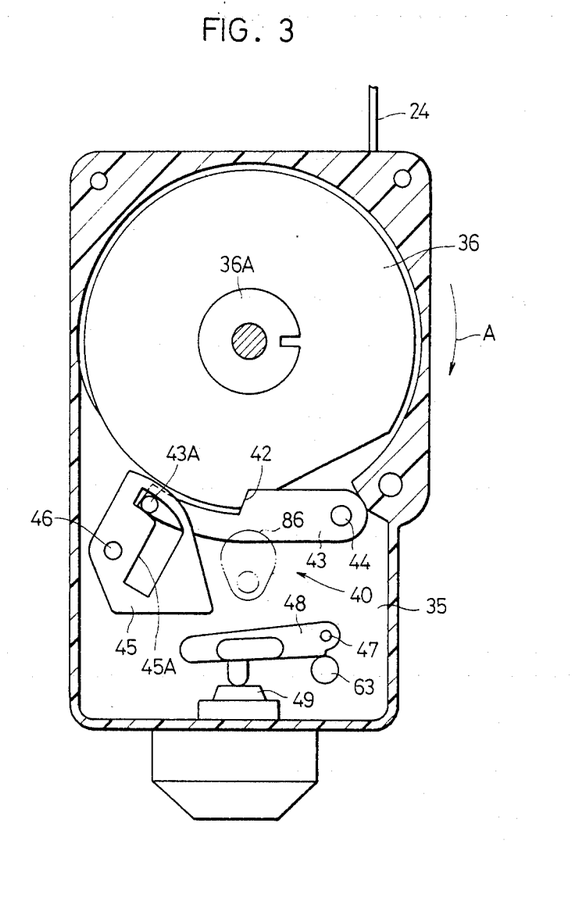
FIG. 3 is a sectional view taken along a line III—III of FIG. 1.
Figure 4:
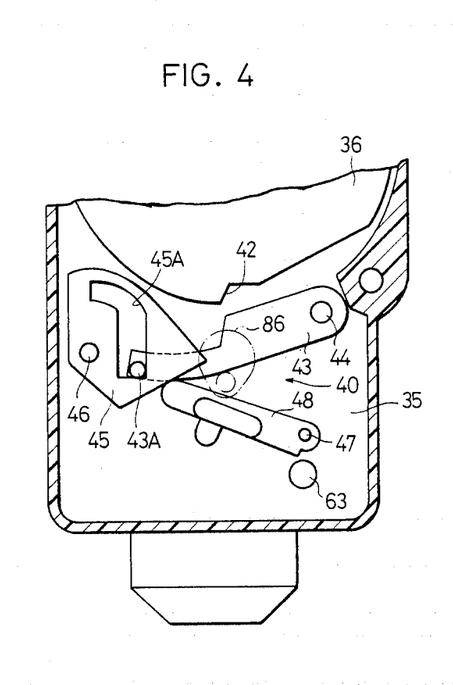
FIG. 4 is an operational view of FIG. 3.

As shown in FIGS. 3 and 4, in the trigger means 40 a pawl 43 latched to a cutout 42 of the operation wheel 36 is rotatably supported to the case 34 through a pin 44, and it is subjected to a control of a cam 45 to be separated from the cutout 42 of the operation wheel 36 in the emergency situation of the vehicle. That is to say, the cam 45 is rotatably supported to the case 34 through a pin 46 and a pin 43A of the pawl 43 is received in an L-shaped groove 45A of the cam 45. The cam 45 is opposed to a sensor lever 48 rotatably supported to the sheet 35 through a pin 47, preferably the cam 45 and the sensor lever 48 being slightly separated from each other, and the sensor lever 48 is disposed on a pendulum 49 suspended from the sheet 35.

The cam 45 receives the pin 43A in one side of the L-shaped groove 45A shown in FIG. 3 in the ordinary running situation of the vehicle, whereby the pawl 43 is maintained in its latched situation to the operation wheel 36 in the ordinary situation. In the emergency situation of the vehicle, however, when the pendulum 49 detects an abnormal acceleration of the vehicle to be swung largely so that the sensor lever 48 is pushed up, the cam 45 is rotated and the pin 43A is moved to the other side of the L-shaped groove 45A, whereby the pawl 43 is put in its releasable situation from the operation wheel 36.

In this connection, the pawl 43 is being subjected to a weak biasing force of resilient means (not shown) in a direction of approach to the operation wheel 36 and it is latched to the cutout 42 of the operation wheel 36. Also, the sensor lever 48 is preferably provided with a snap action mechanism, whereby when the sensor lever 48 is pushed up slightly by the pendulum 49 to pass a predetermined boundary point rotatingly, it is rapidly rotated upwardly by the snap action mechanism.

Disposed between the operation wheel 36 and the takeup shaft 22 is clutch means 50, whereby the operation wheel 36 and the takeup shaft 22 are disconnected to each other in the ordinary running situation of the vehicle, but only in the emergency situation thereof a rotation of the operation wheel 36 is transmitted to the takeup shaft 22 through the clutch means 50. In the clutch means 50, the small diameter shaft connected fixedly to the takeup shaft 22 is fixed at an outer periphery of an end portion thereof with a gear wheel 52 which is formed at its outer periphery with a plurality of covexo-concave portions. Also, the outer periphery of the gear wheel 52 is opposed to a friction plate 53 which is a clutch plate, and levers 56 guided along guide holes 54 formed on the friction plate 53 are engaged with the gear wheel 52.

Particularly speaking, the friction plate 53 is rotatably supported on the small diameter shaft 26 coaxially with the takeup shaft 22 and it is formed at portions of an outer periphery thereof with arms 53A. The arms 53A are forced to contact with the sheet 35, so that the friction plate 53 is subjected to frictional resistance from the sheet 35 at a time of rotation of the friction plate 53. In addition, each of the levers 56 is formed at its base portion with a pin 56A which is received in each of circular holes formed on the operation wheel 36 and is rotatably supported thereby.

Furthermore, each of the levers 56 are formed at its forward end portion with another pin 56B projected in a reverse direction to the pin 56A, and the pin 56B is received in the guide hole 54 of the friction plate 53.

Figure 2:
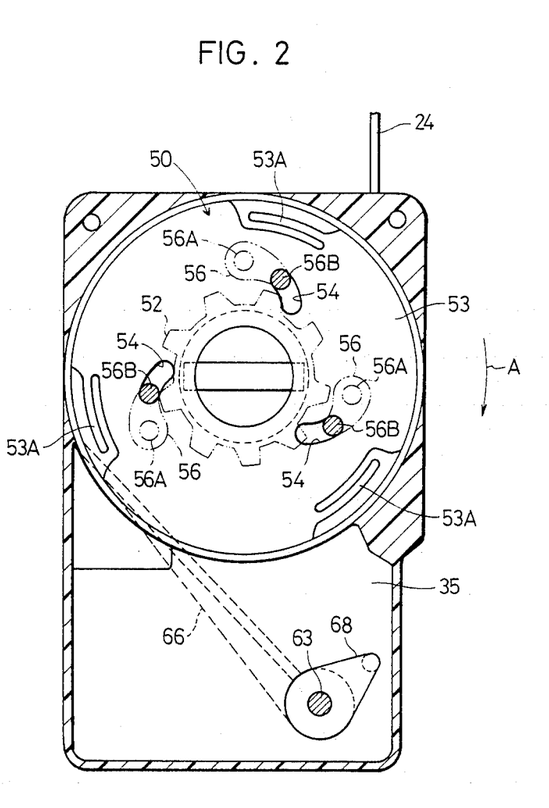
FIG. 2 is a sectional view taken along a line II—II of FIG. 1.

As shown in FIG. 2, the friction plate 53 positions the pin 56B at an outermost end portion of the guide hole 54 to separate it from the gear wheel 52 in the ordinary running situation of the vehicle. In the emergency situation of the vehicle, however, when the operation wheel 36 is rotated in the direction of the webbing retraction, the friction plate 53 guides the pin 56B along the guide hole 54. As a result, the pin 56B is caused to engage with the gear wheel 52 and a rotation force of the operation wheel 36 is transmitted to the lever 56 as a compression force, whereby the gear wheel 52 is rotated in the direction of the webbing retraction.

In the case 34 a cam plate 58 is supported to the cylindrical portion 36A of the operation wheel 36 rotatably relative thereto. The cylindrical portion 36A is fixed at its side of the small spiral spring 30 with a gear wheel 60 rotatably fixed to the cylindrical portion 36A. The gear wheel 60 carries a pin 62 on one face thereof and disposed to be engageable with the cam plate 58. When the cylindrical portion 36A is rotated by the large spiral spring 38 through the trigger means 40, the gear wheel 60 is rotated together with the cylindrical portion 36A, i.e., the pin 62 is also rotated in a clockwise direction from a position shown in FIG. 5, so that when the pin 62 reaches a position shown in FIG. 6, it rotates the cam plate 58 in a clockwise direction.

Opposed to the cam plate 58 is a forward end portion of a lever 64 rotataby supported to the case 34 through a rod 63. As shown in FIG. 1, the pin 63 penetrates the sheet 35 and it is fixed at a forward end portion with a lever 66. One end portion of the lever 66 is opposed to an outer periphery of the webbing which has retracted on the takeup shaft 22. Fixed to the other end portion of the rod 63 is an arm 68 which is biased in a direction of a reduction of an included angle between the arm 68 and the lever 64 by a biasing force of a resilient means (not shown). In consequence, when the cam plate 58 is rotated from its position shown in FIG. 5 to its position shown in FIG. 6, the lever 64 is rotatable in a counterclockwise direction about the pin 63 and the lever 66 is rotated in a counterclockwise direction up to a position shown in FIG. 6 in accordance with an increase of an outer diameter of the webbing 24 retracted on the takeup shaft 22, whereby the lever 64 is rotated in a counterclockwise direction up to a position shown in FIG. 6 by the arm 68.

As shown in FIG. 1, fixed to the small diameter shaft 26 between the gear wheel 60 and the small spiral spring 30 is a pinion 70. The pinion 70 and the gear wheel 60 fixed to the cylindrical portion 36A are respectively opposed to a gear wheel 74 and a pinion 76 guided along a guide hole 72 (shown in FIGS. 5 and 6) formed on the case 34. The gear wheel 74 and the pinion 76 are fixed to a movable shaft 78, and the movable shaft 78 is guided along the guide hole 72, so that the gear wheel 74 and the pinion 76 are movable by a stroke of the guide hole 72. Caused to abut on the movable shaft 78 is a forward end portion of a wire spring 80, one end thereof being fixed to the case 34, whereby the gear wheel 74 and the pinion 76 are biased respectively in directions of separation from the gear wheel 60 and the pinion 70. When the lever 64 is moved from the position shown in FIG. 5 to the position shown in FIG. 6, the movable shaft 78 is pushed out from the position shown in FIG. 5 to the position shown in FIG. 6 by a slope face 64A formed on an intermediate portion of the lever 64, so that the pinion 76 and the gear wheel 74 are caused to engage with the gear wheel 60 and the pinion 70, respectively.

In addition, opposed to the gear wheel 74 is a gear wheel 84 rotatably supported to the case 34 through a shaft 82. When the gear wheel 74 is pushed by the slope face 64A to be moved within the guide hole 82 up to a position shown with a double dotted line in FIG. 6, it is engaged with the gear wheel 84.

The shaft 82 supporting the gear wheel 84 is fixed at one end portion thereof with a cam 86 which is opposed to the sensor lever 48. If the cam 86 is rotated after the sensor lever 48 is rotated from a position shown in FIG. 3 to a position shown in FIG. 4, then the sensor lever 48 is forcibly pushed down by the rotation force of the cam 86 and it is returned back to the position shown in FIG. 3.

The other end portion of the takeup shaft 22 elongated from the leg plate 18 is provided at an outside of the leg plate 18 with an inertial locking mechanism 96, a detailed description thereof being omitted, whereby the takeup shaft 22 is prevented from rotation in a direction of a webbing unwinding in the emergency situation of the vehicle.

Description will now be given of operation of the embodiment constructed in the above manner.

The occupant is capable of unwinding the webbing 24 from the takeup shaft 22 and of restraining himself by the webbing 24. When the occupant is restrained by the webbing 24, the webbing 24 is caused to contact with the occupant softly since the biasing force of the small spiral spring 30 always acts upon the takeup shaft 22 weakly in the direction of the webbing retraction. In the ordinary running situation of the vehicle, the inertial locking mechanism 96 is not worked, so that the occupant can change his attitude voluntarily.

When the vehicle is in an emergency situation as a collision, the pendulum 49 is swung to push up the sensor lever 48. Accordingly, the cam 45 is rotated and the pawl 43 is pushed down by the operation wheel 36 to be separated from the operation wheel 36. The operation wheel 36 is rotated in the direction of the webbing retraction by the biasing force of the large spiral spring 38.

The levers 56 are also rotated in accordance with the rotation of the operation wheel 36 and they are guided along the guide holes 54 of the friction plate 53 subjected to a rotation resistance from the sheet 35 through the arm 53A to be engaged with the gear wheel 52. As a result, the operation wheel 36 is connected to the gear wheel 52, so that the biasing force of the large spiral spring 38 acts upon the takeup shaft 22. In this connection, after the operation wheel 36 and the gear wheel 52 are connected to each other, the friction plate 53 is also rotated together with the operation wheel 36.

Figure 5:
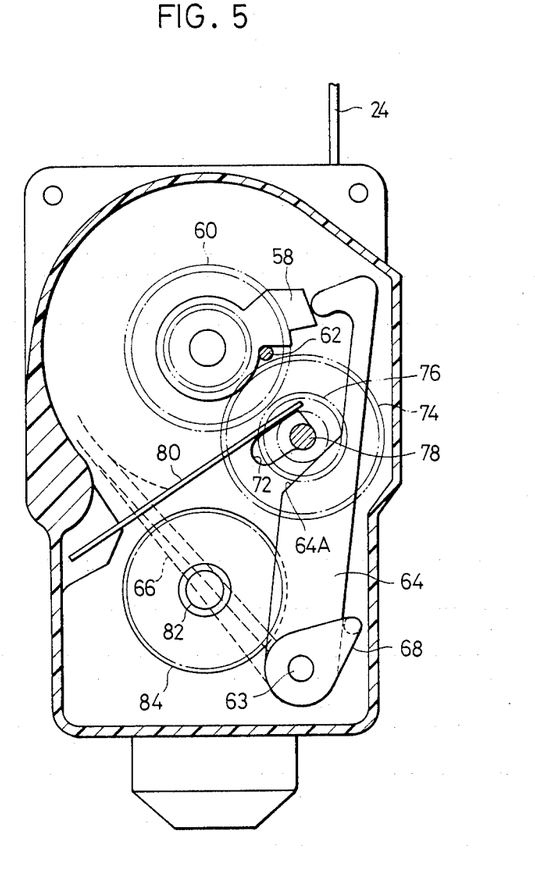
FIG. 5 is a sectional view taken along a line V—V of FIG. 1.
Figure 6:
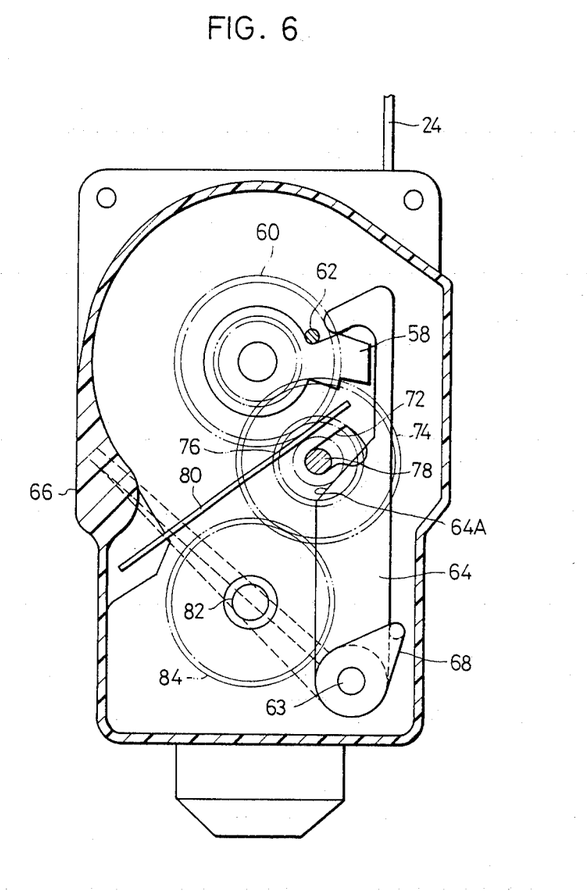
FIG. 6 is an operational view of FIG. 5.

While the operation wheel 36 is being rotated in this manner, the lever 64 is maintained at the position shown in FIG. 5 by the cam plate 58, and the gear wheel 74 and the pinion 76 are respectively separated from the pinion 70 and the gear wheel 60 by the wire spring 80, so that the operation wheel 36 is not prevented from its rotation. However, when the operation wheel 36 rotates the takeup shaft 22 by approximate one rotation owing to the biasing force of the large spiral spring 38, the pin 62 fixed to the gear wheel 60 is moved from the position shown in FIG. 5 to the position shown in FIG. 6 to move the cam plate 58 from engagement with the forward end of the lever 64 whereby said lever is made rotatable in a counterclockwise direction.

Such a retracting rotation of the takeup shaft 22 by the large spiral spring 38 causes the webbing 24 restraining the occupant to contact closely with the occupant, so that a clearance between the webbing 24 and the occupant is removed, i.e., a slack of the webbing 24 is cancelled. On the other hand, simultaneously therewith the inertial locking mechanism 96 stops the unwinding rotation of the takeup shaft 24 instantaneously, so that the occupant is restrained closely by the webbing 24 and he is kept in safety.

After the vehicle is released from the emergency situation, the occupant releases himself from the restrained situation by the webbing 24 and he causes the takeup shaft 22 to retract the webbing 24 thereon in a maximum amount. In accordance with the retracting motion of the takeup shaft 22 the outer diameter of the webbing 24 retracted on the takeup shaft 22 is increased and the lever 66 is rotated in a counterclockwise direction from the position shown in FIG. 5 up to the position shown in FIG. 6. In consequence, the lever 64 is forcibly rotated in the counterclockwise direction by the arm 68, and the gear wheel 74 and the pinion 76 are caused to engage with the pinion 70 and the gear wheel 60, respectively against the biasing force of the wire spring 80. Simultaneously therewith, the gear wheel 74 is also engaged with the gear wheel 84.

Thus, the levers 64, 66, the wire spring 80, the cam plates 58 and the arm 68 constitute an actuating means for putting the gear wheel 74 and the pinion 76, and the pinion 70 and the gear wheel 60 in connected situations, respectively.

Thereafter, when the webbing 24 is unwound by the occupant, the rotation force of the takeup shaft 22 is transmitted to the pinion 70 through the small diameter shaft 26 to rotate the pinion 70 and further it is transmitted to the gear wheel 60 through the gear wheel 74 and the pinion 76, so that the large spiral spring 38 is wound up against its biasing force. Thus, gear means including the gear wheels 60 and 74 and the pinions 70 and 76 constitutes clutch means. When the operation wheel 36 is rotated reversely up to its initial situation, the pawl 43 is latched to the cutout 42 of the operation wheel 36 by the biasing force of the resilient means (not shown) and the winding-up of the large spiral spring 38 is accomplished, so that the operation wheel 36 is returned back to the initial situation. In this connection the cam 45 is rotated about the pin 46 from the position shown in FIG. 4 to the position shown in FIG. 3 by its self-weight.

In addition, as the gear wheel 84 is rotated by the gear wheel 74, the sensor lever 48 is forcibly pushed down from the situation shown in FIG. 4 to the situation shown in FIG. 3 by the cam 86.

Such an unwinding motion is subjected to reduction by a combination of the pinion 70 and the gear wheel 74 and a combination of the pinion 76 and the gear wheel 60 to act as a winding-up force for winding up the large spiral spring 38, whereby the occupant can wind up the large spiral spring 38 with a small unwinding force. Thus, these gear wheels and pinions constitute reduction means.

Accordingly, the webbing retractor 10 is returned back to its initial situation by such an operation for unwinding the webbing 24, and, after the occupant causes the takeup shaft 22 to retract the webbing 24 thereon again, he is capable of unwinding the webbing 24 to restrain himself by the webbing 24 and he can be put in his closely restrained situation by the webbing 24 in the next emergency situation of the vehicle.

What is claimed is:

1. A webbing tension device adapted for use in a webbing retractor for protecting an occupant in an emergency situation of a vehicle, which comprises:
   (a) small resilient means for biasing a webbing takeup shaft secured thereto with one end portion of an occupant restraining webbing and supported rotatably to the webbing retractor weakly in a direction of a webbing retraction;
   (b) large resilient means for biasing the takeup shaft in the direction of the webbing retraction strongly in the emergency situation of the vehicle;
   (c) first clutch means disposed between the takeup shaft and the large resilient means for connecting them to each other when the webbing is fully retracted on to the takeup shaft after the vehicle is released from the emergency situation,
   whereby when the takeup shaft is rotated in an unwinding direction of the webbing after the webbing is fully retracted on to the takeup shaft, the large resilient means is wound up to be returned back to its initial situation.

2. A webbing tension device as set forth in claim 1, which further comprises trigger means for actuating the large resilient means in the emergency situation of the vehicle and preventing the large resilient means from being further wound up when the large resilient means is returned back to the initial situation.

3. A webbing tension device as set forth in claim 2, wherein the large resilient means is secured at its one end to an operation wheel disposed coaxially to the takeup shaft and rotatably relative thereto, and second clutch means is disposed between the takeup shaft and the operation wheel, whereby the biasing force of the large resilient means is transmitted to the takeup shaft through the second clutch means in the emergency situation of the vehicle.

4. A webbing tension device as set forth in claim 3, wherein the takeup shaft is fixed at its one end coaxially with an extension shaft, the operation wheel is supported rotatably on the extension shaft and the small resilient means is secured at its one end to the extension shaft, whereby the takeup shaft is always biased in the direction of the webbing retraction by the small resilient means so that a tension is imparted to the webbing.

5. A webbing tension device as set forth in claim 4, wherein the first clutch means comprises gear means disposed between the operation wheel and the takeup shaft and actuating means for putting the gear means in its engaged situation when the webbing is fully retracted on the takeup shaft after the vehicle is released from the emergency situation.

6. A webbing tension device as set forth in claim 5, wherein the gear means comprises a combination of gear wheel and pinion, whereby a webbing unwinding rotation of the takeup shaft is subjected to reduction to be transmitted to the large resilient means when the webbing is unwound from the takeup shaft after the webbing is fully retracted on the takeup shaft.

7. A webbing tension device as set forth in claim 5, wherein the gear means comprises a first pinion fixed to the extension shaft, a first gear wheel fixed to the operation wheel, a second gear wheel opposed to the first pinion and a second pinion opposed to the first gear wheel, whereby a webbing unwinding rotation of the takeup shaft is subjected to reduction to be transmitted to the large resilient means when the webbing is unwound from the takeup shaft after the webbing is fully retracted on the takeup shaft.

8. A webbing tension device as set forth in claim 7, wherein the second gear wheel and the second pinion are fixed to a movable shaft moved by the actuating means in such a direction that they are engaged respectively with the first pinion and the first gear wheel when the webbing is fully retracted on the takeup shaft.

9. A webbing tension device as set forth in claim 8, wherein the actuating means comprises a first lever abutting on an outer periphery of the webbing retracted on the takeup shaft and moved in accordance with increase and decrease of an outer diameter thereof and a second lever connected to the first lever and moving the movable shaft in accordance with the movement of the first lever in such a direction that the second gear wheel and the second pinion are respectively engaged with the first pinion and the first gear wheel, whereby the second gear wheel and the second pinion are caused to engage with the first pinion and the first gear wheel when the webbing is retracted fully on the takeup shaft so that the outer diameter thereof is increased after the vehicle is released from the emergency situation.

10. A webbing tension device as set forth in claim 9, wherein the actuating means includes wire-type resilient means biasing the movable shaft in such a direction that the second gear wheel and the second pinion are separated respectively from the first pinion and the first gear wheel, whereby the first clutch means is put in its disconnected situation in the emergency situation of the vehicle.

11. A webbing tension device as set forth in claim 10, wherein the actuating means further includes a cam plate supported rotatably to the operation wheel, a cam portion thereof being abutting on a forward end portion of the second lever in an ordinary running situation of the vehicle, and in the emergency situation the cam plate being rotated by a pin formed on the first gear wheel opposite to the cam plate when the operation wheel is rotated in the direction of the webbing retraction by the large resilient means, whereby the second lever is put in its movable situation in such a direction that the second gear wheel and the second pinion are engaged with the first pinion and the first gear wheel.

12. A webbing tension device adapted for use in a webbing retractor for protecting an occupant in an emergency situation of a vehicle, which comprises:
   (a) a small spiral spring biasing a webbing takeup shaft secured thereto with one end portion of an occupant restraining webbing and supported rotatably by a frame of the webbing retractor weakly in a direction of a webbing retraction;
   (b) a large spiral spring biasing the takeup shaft strongly in the direction of the webbing retraction in the emergency situation of the vehicle;
   (c) first clutch means disposed between the takeup shaft and the large spiral spring for connecting them to each other when the webbing is retracted fully on the takeup shaft after the vehicle is released from the emergency situation, whereby a webbing unwinding rotation of the takeup shaft is transmitted to the large spiral spring so that the large spiral spring is wound up when the webbing is unwound from the takeup shaft after it is fully retracted on the takeup shaft; and
   (d) trigger means actuating the large spiral spring in the emergency situation of the vehicle and preventing the large spiral spring from being further wound up when the winding-up of the large spiral spring is accomplished.

13. A webbing tension device as set forth in claim 12, wherein the large spiral spring is secured at its inner end to an operation wheel disposed coaxially to the takeup shaft and rotatably relative thereto, and second clutch means is disposed between the takeup shaft and the operation wheel, whereby a biasing force of the large spiral spring is transmitted to the takeup shaft through the second clutch means in the emergency situation of the vehicle.

14. A webbing tension device as set forth in claim 13, wherein the takeup shaft is fixed at its one end coaxially with a small diameter shaft, the operation wheel is supported rotatably on the small diameter shaft and the small spiral spring is secured at its inner end to the small diameter shaft, whereby the takeup shaft is always biased in the direction of the webbing retraction weakly by the small spiral spring so that a tension is imparted to the webbing.

15. A webbing tension device as set forth in claim 14, wherein the first clutch means comprises gear means disposed between the operation wheel and the small diameter shaft and actuating means for putting the gear means in its engaged situation when the webbing is fully retracted on the takeup shaft after the vehicle is released from the emergency situation.

16. A webbing tension device as set forth in claim 15, wherein the gear means comprises a combination of gear wheel and pinion, whereby the webbing unwinding rotation of the takeup shaft is subjected to reduction to be transmitted to the large spiral spring when the webbing is unwound from the takeup shaft after the webbing is fully retracted on the takeup shaft.

17. A webbing tension device as set forth in claim 15, wherein the gear means comprises a first pinion fixed to the small diameter shaft, a first gear wheel fixed to the operation wheel, a second gear wheel opposed to the first pinion and a second pinion opposed to the first gear wheel, whereby the webbing unwinding rotation of the takeup shaft is subjected to reduction to be transmitted to the large spiral spring when the webbing is unwound from the takeup shaft after the webbing is fully retracted on the takeup shaft.

18. A webbing tension device as set forth in claim 17, wherein the second gear wheel and the second pinion are fixed to a movable shaft moved by the actuating means in such a direction that they are engaged respectively with the first pinion and the first gear wheel when the webbing is fully retracted on the takeup shaft.

19. A webbing tension device as set forth in claim 18, wherein the actuating means comprises a first lever abutting on an outer periphery of the webbing retracted on the takeup shaft and moved in accordance with increase and decrease of an outer diameter thereof, and a second lever connected to the first lever through a rod and moving the movable shaft in accordance with the movement of the first lever in such a direction that the second gear wheel and the second pinion are engaged respectively with the first pinion and the first gear wheel, whereby the second gear wheel and the second pinion are caused to engage with the first pinion and the first gear wheel when the webbing is retracted fully on the takeup shaft after the vehicle is released from the emergency situation.

20. A webbing tension device as set forth in claim 19, wherein the actuating means includes a wire spring biasing the movable shaft in such a direction that the second gear wheel and the second pinion are separated respectively from the first pinion and the first gear wheel, whereby the first clutch means is put in its disconnected situation in the emergency situation of the vehicle.

21. A webbing tension device as set forth in claim 20, wherein the actuating means further includes a cam plate supported rotatably to the operation wheel, a cam portion thereof being abutting on a forward end portion of the lever in an ordinary running situation of the vehicle, and in the emergency situation the cam plate being rotated by a pin formed on the first gear wheel opposite to the cam plate when the operation wheel is rotated in the direction of the webbing retraction by the large spiral spring, whereby the second lever is put in its movable situation in such a direction that the second gear wheel and the second pinion are engaged with the first pinion and the first gear wheel.

* * * * *